3,492,250
CLOSED CELL FOAM
Alden J. Deyrup, West Goshen Township, Chester County, Pa., assignor to E. I. du Pont de Nemours and Company, Wilmington, Del., a corporation of Delaware
No Drawing. Continuation-in-part of application Ser. No. 181,168, Mar. 20, 1962. This application May 21, 1963, Ser. No. 282,160
Int. Cl. C08f 47/08
U.S. Cl. 260—2.5
25 Claims

ABSTRACT OF THE DISCLOSURE

This invention relates to essentially closed cell foam made from a composition comprising an aqueous solution of polyvinyl alcohol and a gelling agent.

---

This invention relates to light-weight cellular products, in particular to cellular products useful as insulating, acoustical and packaging materials, and to a process for their production from a predominantly aqueous medium.

This application is a continuation-in-part of my application Ser. No. 181,168, filed Mar. 20, 1962, now abandoned.

Low-cost fibrous materials such as rock wool, glass fiber, and cellulose products are widely used in commercial and residential building construction for thermal insulation. Despite their moderate cost per unit weight, the use of these fuel-saving materials is now limited, either in thickness or extent of application, by the total cost of the large volume needed, and also by the cost of installation, which frequently involves the use of an added vapor barrier, such as a plastic film or the like.

Many cellular insulating materials, both organic and inorganic or cementitious, have utility for various insulating purposes. The organic or polymeric cellular materials have generally been too expensive for general architectural usage, except in specialized cases, such as where expensive electrical heat energy must be conserved. Inorganic and cementitious cellular materials have been usually of low cost per unit weight, but their high densities have generally restricted their usage to special types of building construction.

An approach to a less dense, and therefore more economical, polymeric cellular material involves the steps of (1) generating a foam in a dilute aqueous solution of a film-forming polymer, (2) placing the wet foam in an ordinary building structure, and (3) allowing the water to evaporate. The prior methods and materials proposed to do this have not been satisfactory since in practice they result in excessive wetting or soaking of ordinary building materials such as fiberboard, plaster, and electrical wiring and insulation. Such soaking of water-wettable materials may result in damage to these materials, but more importantly it causes some breakdown of the wet foam structure, usually with concomitant loss of integrity of bond of the cellular structure to the building structure.

Many and varied aqueous solutions of natural and synthetic polymeric materials have been used to generate foams. These wet foams have been used for various purposes such as fire-fighting and protection of plants from freezing. It is generally recognized that the stability of such foams depends on the amount and type of surface-active and foam-stabilizing agents. In addition, the stability of such foams in general increases with increasing viscosity and also with decreasing bubble size. In spite of their stability, however, it is typical of such foams eventually to break down by coalescence of bubbles, by draining away of liquid, or by some combination thereof.

For this reason, the prior aqueous foams of polymer solutions have not been known to form deep masses of closed-cellular structure. More especially, closed-cellular products do not result when drying is slow or restricted, as in the case of foam confined between the inner and outer walls of a building.

In solubilizers have been incorporated into foams of aqueous polymer solutions to make the cellular structure more lasting so that they can be dried without entire loss of the closed or cellular structure. Thus, sponge substitutes have been made from aqueous polymer solution foams, where gelling is effected during the breakdown of the closed cell structure, resulting in a dried open-cell or spongy product. Alginate foams, beaten or whipped to a fine froth, have been gelled by chemical additives to make, after drying, materials resembling cork. These are, however, no less dense than many other common cellular materials. Although some thermal insulating materials have been made in this manner, the lowest densities of such dried aqueous polymer foams have been about 1 lb./cu. ft. In attempts at lower densities, such as 0.5 lb./cu. ft., the dried foam structures have been unstable, and/or not closed-cellular, and/or too weak for use. Some very light aqueous foams have been used for purposes where natural decay and dissipation of such foams are advantageous. These are necessarily of temporary duration, and, if closed-cellular, do not withstand atmospheric pressure changes without severe damage. In no case has any such foam been suitable for direct introduction, in the wet state, into ordinary building structures, built with the ordinary water-sensitive building materials, to provide a dried closed-cellular insulating material.

An object of this invention is to provide an extremely light-weighted, closed-cellular product. Another object is to provide a closed-cellular product which can be economically introduced into building structures to provide effective insulating performance, including sealing against wind seepage around door frames, window frames, and other apertures. Another object is to provide a cellular product with stability to vibrations, temperature changes, and normal atmospheric pressure variations.

A further object of this invention is to provide an aqueous medium which can be foamed with air or other gas, which foam can be placed in the wet state within ordinary building structural cavities, the said foam not to penetrate deeply into or soak porous building materials, and to dry by natural evaporation to form a rigid or elastic closed-cellular insulating structure. Another object is to provide an aqueous medium which can be used to make a foam which will remain as a stable cellular structure for at least 24 hours, even though evaporation of water be entirely prevented, and then subsequently dry to a permanent, continuous, rigid or elastic, closed-cellular structure. A still further object is to provide a dry mixture which can be dispersed in water and then heated to form an aqueous medium suitable for preparation of a light-weight, closed cellular product.

Another object is to provide a closed-cellular material having high acoustic absorption and/or low acoustic transmission. A further object is to provide a closed-cellular material of value as a packing material.

A still further object is a process for producing a closed-cellular material making possible the application of useful insulation by a less laborious process than those now conventionally used.

These and other objects are attained by my discovery that aqueous solutions of organic polymers, which, either by themselves or in combination with gelling agents, are capable of forming a gel structure under controllable conditions, can be blown to produce essentially closed-cell foams having bubble sizes in the range of 0.06 to 0.4 inch; placed by flowing or pouring directly into the desired position, including positions such as the voids in building walls or ceiling spaces; and allowed to dry by diffusion of water as vapor, not liquid, into and through the adjacent surroundings which may, for example, be ordinary building materials. A thermally insulating and acoustic absorptive, essentially closed-cell foam containing 0.01 to 0.2 lb. of polymer per cubic foot and having adequate strength and elasticity to withstand stresses of shrinkage during drying, and also to withstand extremes of building vibration and atmospheric pressure changes is thus obtained. By incorporation of suitable infrared transmission control agents, e.g., infrared absorptive or reflective pigments, in such foam mixture, final products having excellent insulating value and densities in the range of 0.05 to 0.3 lb./cu. ft., inclusive of polymer and the said pigments, are obtained.

In the practice of the invention, various water-soluble polymers or mixtures thereof may be utilized. It is essential, however, to select for this purpose polymeric materials which, with cellular products containing 0.01 to 0.2 lb. of polymer per cubic foot, in some cases with a reasonable degree of pigmentation as noted below, will withstand atmospheric pressure changes of 4 in. of mercury, as measured by application of gas pressure, without cell rupture or other substantial damage to the dry foam. This minimum required compressive strength, which will hereinafter be referred to as a pneumatic compressive strength of 4 in. of mercury, corresponds to about the maximum atmospheric pressure variations that are experienced in any one locality. This strength thus represents an essential requirement for satisfactory performance of my light-weight cellular products as insulating, acoustical and packaging materials.

A typical polymer, suitable for the practice of this invention, is polyvinyl alcohol. By this term, I mean the water-soluble products obtained by the partial (at least 75%) or complete alcoholysis or hydrolysis of polyvinyl esters, e.g., polyvinyl acetate. A preferred material is the commercially available, high molecular weight, fully hydrolized grade, having a 4% aqueous solution viscosity of 55–65 centipoises. Another useful group of polymers are those derived from acrylamide, including the relatively high molecular weight copolymers containing small percentages of comonomers such as acrylic acid. Other water-soluble natural or synthetic polymers, or mixtures thereof, may be chosen. Furthermore, the water-soluble polymer may be replaced in part by aqueous dispersions of various polymers. For example, good results have been obtained in polyvinyl alcohol systems in which up to 90% or 95% of the polyvinyl alcohol is replaced by aqueous dispersions of polymers such as polyvinyl acetate, vinyl acetate/alkyl maleate copolymers, butadiene/styrene copolymers, dispersions of cyclized rubber, maleic anhydride/vinyl ether copolymers, and the like. If desired, several water-soluble polymers may be employed simultaneously, with or without the presence of several aqueous dispersions of other polymers. If several water-soluble polymers are employed, it is not essential that all of them be gelled by the gelling agent, provided that one of them is gelled.

The selection of suitable polymers is guided by the physical strength and elastic properties of water-cast films thereof, or more exactly, by these physical properties measured on films containing the gelling agent chosen. To ensure permanence of insulation, it is preferred to use polymeric materials which are not subject to hydrolytic or enzymatic degradation in the presence of moisture or high humidity.

Such polymers may be caused to gel controllably in a variety of ways, depending on the specific polymer used. For example, they may be gelled with thermally reversible gelling agents. In this case, the foam should be generated and placed in final position in the warm, nongelled state, that is, at a temperature above the gel point, whereafter the gel structure develops in the aqueous medium rapidly upon cooling below the gel point. As another example, the foam may be generated or treated after generation with a gas containing a catalyst such as an acid gas or a reactant such as oxygen for a cross-linking reaction of a polymeric constituent of the solution, which will result in gelling the solution. Or two or more liquids or foams may be blended which contain reactants which cause gel formation.

While a variety of polymer and gelling agent systems may be used, it is essential that they be chosen so that gelling is substantially not present during generation of foam, yet gelling will occur within seconds or at most a few minutes after the foam is placed in final position. This is found to be essential for at least one of four reasons: (1) to assure stability of foam structure regardless of how slowly drying occurs, which may require several days or even weeks; (2) to prevent drainage of substantial quantities of liquid to lower levels; (3) to prevent soaking of the foam liquid into porous building materials such as plasterboard, wallboard, electrical wiring, insulation, etc.; and/or (4) to permit the foam to be placed in a vertical and largely unconfined position without running or falling out. A rapid change of the liquid phase in the foam from a substantially liquid state to a gelled state is particularly essential for the last-mentioned characteristic. If the change from liquid to gel is not fast, the foam will not only adversely soak such porous materials, but also may break down in part and lose proper bonding of the cellular structure to the building walls. However, the gelling should not be completed until after the foam has been generated and flowed or placed in position because a foam in the fully gelled state is not readily flowed through hoses, orifices, nozzles, etc., without damage to the cellular structure. In contrast, a foam in which the liquid phase has not been gelled is readily hosed, piped, spread and flowed into position.

For applications of the type contemplated herein where permanence of the foam structure is desired, the gel structure that must be developed in the aqueous medium after the foam has been generated and placed in position should be a type which I designate as "non-flowable." By this term I means that the gel structure must not flow under small but finite stress applied thereto. Examples of aqueous gel structures which do not meet my definition of non-flowable are the polyvinyl alcohol-borax gel and the characteristic gel of aqueous methyl cellulose solutions.

Referring to the poyvinyl alcohol-borax gels, these can be formed, for example, by treating an aqueous medium containing polyvinyl alcohol and boric acid with an alkaline solution or other neutralizing agent. The gel which is formed is initially quite strong. The bonds which are apparently formed between the boron-containing constituent and the various different chains of the polymer, however, are believed to be quite labile. When the over-all structure is subjected to any significant stress, these bonds apparently shift around quite readily and instead of tending to hold the structure in its original shape, they fasten onto a new portion of polymer chain which is now closer at hand. It is possible, however, to use borax as an initial gelling agent, provided that another gelling agent is also present, which may function more slowly, but which eventually will take over the main job of maintaining the structural integrity of the foam as the borax to weaken.

An example of a suitable polymer-gel system of the permanent type is the well-known polyvinyl alcohol-Congo red, thermally reversible gel system. The speed and strength of gelling and also the temperature of gelling in this system may be increased to a desired degree, depending on conditions of use, by increasing concentration of Congo red and/or polyvinyl alcohol, or by using a higher molecular weight polyvinyl alcohol. I find that the speed and strength of gelling of this system may also be advantageously improved by pH control, as with a small amount of acetic acid-alkali acetate buffer. The gel structure may readily be melted, whereafter a foam is generated by blowing with air. The warm foam remains warm when piped through a delivery hose, and when entering the building cavity. It is cooled by the walls, which it wets, but a gel layer quickly forms and prevents the foam from entering porous materials or even from going through visible cracks. Other thermally reversible gelling agents which can be used in place of Congo red include direct azo dyestuffs such as Direct Orange 8 (Colour Index 22130) and Direct Green 12 (Colour Index 30290).

Another system for gelling polymers of the type contemplated herein involves the use of a compound of an element capable of existing in more than one valence state such as chromium, iron, titanium, or vanadium. Titanium in the trivalent state does not gel polyvinyl alcohol, but when it is transformed into tetravalent titanium in immediate and direct contact with polyvinyl alcohol, it becomes a highly effective gelling agent. This transformation can be accomplished by mixing a solution containing a trivalent titanium salt such as titanium trichloride with a solution which contains the polyvinyl alcohol together with a suitable oxidizing agent, such as a nitrate. Alternately, the trivalent titanium compound may be mixed with the polyvinyl alcohol solution, and the oxidizing agent may be subsequently introduced. For best results, it is important that the titanium oxidation not take place until the trivalent titanium compound is closely intermixed with the polyvinyl alcohol, in contrast to forming the tetravalent titanium well in advance and thereafter mixing it with the polymer. Comparable results are also obtainable by converting chromium from the hexavalent state to the trivalent state, iron from the divalent state to the trivalent state, and/or vanadium from the pentavalent state to a lower valence state.

Various gelling systems depend on a change in the pH to bring about gelation. This may be accomplished by introducing a suitable acidic or alkaline agent into the polymer-containing aqueous medium, whereupon the resulting mixture is promptly subjected to foaming. In another system, the foam is first generated and is then promptly treated with an acidic gas such as carbon dioxide or hydrogen chloride, or an alkaline gas such as ammonia, in order to bring about the gelation.

Still another gelation system involves providing the gelling agent in the proper valence state but in a complexed form which initially inhibits its activity, and then at the desired time destroying the complex so as to initiate the gelation reaction. Tetravalent titanium, for example, can be suitably complexed by various hydroxy acids such as lactic acid, tartaric acid, citric acid and oxalic acid. When titanium lactate or potassium-titanium oxalate or an alkali fluotitanate is converted from a pH in the range of 2–6 to a pH in the range of 7–9, the gelation process commences promptly with any polyvinyl alcohol that is present in the system. The speed of this gelation reaction tends to be increased by means of a higher (i.e., more alkaline) pH, and it tends to be decreased by the presence of increasing concentrations of the anion of the acid, i.e., lactate, oxalate, etc. By simultaneously controlling both the pH and the amount of excess anion, it therefore becomes possible to control the gelation rate very precisely and to vary it at will from very short time periods of a few seconds or less to much longer time periods, of the order of many minutes or even hours.

These latter gelation systems may be utilized, for example, by mixing one solution containing the polymer and the titanium oxalate with another solution containing the desired amount of alkaline reagent and the desired amount of excess oxalate ion. Promptly after mixing the two solutions together, the combined liquid is passed through a tube into which suitable-sized air bubbles are injected in order to obtain a foam of the desired cell size. It is also possible to use this general approach with a single body of liquid which is maintained very close to the critical pH point by means of a bicarbonate-carbonic acid buffer system. When this liquid medium is subjected to foaming by introducing air bubbles in a suitable manner, the web portions of the resulting foam give off carbon dioxide vapor into the atmosphere and into the void spaces in the newly formed foam until a new equilibrium is established between the carbon dioxide in the vapor phase and the carbonic acid and bicarbonate in the water-containing phase. This liberation of carbon dioxide shifts the pH toward the basic side, with the result that the gelation reaction is initiated and it continues until a strong gel has been produced.

Many aqueous polymer solution-gelling agent systems are known, varying widely in strength, gel elasticity, rate of gelling and other characteristics. Since gelling rate can be affected by catalysts, elevated temperature, etc., no simple general recipe can be given. It is a matter of choice to select the gelling agent, temperature, mode of mixing, etc., for any specific water-soluble polymer and rate of foam application. The choice should be based on securement of rapid change, usually in from a few seconds to a few minutes, but more particularly accompanied by adequate adhesive wetting of porous materials without substantial penetration thereinto. In some cases, a separate gelling agent need not be added if the polymer itself is capable of controllable and reversible gelling in water solution. However, if thermally reversible gelling is used, the materials should be selected so that gelling will occur above about 35° C. in order that the gel structure will form at any normal summer temperature.

The polymer-gel system should also be selected so that the gelled polymer should be of a rubbery-elastic type, rather than the weak brittle type. Thus, the aqueous polymer-gel should be of the type which can be stretched to substantial elongation without fracture. This is necessary because the aqueous medium may undergo as high as 95% to 98% volume shrinkage during the process of drying. This shrinkage must not result in rupture of the cellular structure in the gelled state, at any stage from fully wet gel to the dry end-product. One of the surprising characteristics of the foams of this invention is that, on a microscale, the individual cell walls and cell borders within the foam undergo a very large shrinkage in volume whereas the overall foam mass undegoes a minimum shrinkage in volume due to the fact that the closed-cell structure remains largely intact and the air pressure within each individual cell prevents the cell as a whole from undergoing much shrinkage.

The optimum operating conditions with different polymer-gel systems will be found to differ. However, the conditions should be selected to result in an essentially closed cell foam, that is, one in which all or most of the cell walls remain intact during drying. If gelling is too slow, either a weak or a brittle or an open-cell structure may develop, resulting in poor thermal resistivity, excessive shrinkage, and collapse in large sections. The closed cellular products of this invention may occasionally contain a minor proportion of open cells, that is, with ruptured cell walls. These are not advantageous, although in small amount they do small harm.

The foaming may be accomplished by liberation of a gas chemically or by a variety of mechanical ways of entraining air or other gas in the liquid. The gas should preferably have a water solubility at 25° C. and one atmosphere pressure of less than 1 volume of gas per 10 volumes of water. A preferred gas is air. The foaming method employed should be adapted to yield reasonably uniform bubbles having controlled sizes, within the range 0.06 to 0.4 inch. A suitable method is by passing air under pressure into a substantial volume of the fluid, that is, non-gelled, aqueous medium through small uniform multiple orifices or capillary tubes. Other methods involve flowing the as-yet ungelled aqueous medium in a thin tube, in a capillary, or in a thin sheet, past one or more orifices of suitable and uniform size through which air bubbles are introduced under pressure. The air can be introduced, for example, by means of a mixing T or a mixing Y, or the aqueous medium can be flowed thru a tube containing a multitude of small holes along its length, through which the air or other suitable gas is introduced. By suitably proportioning the ratio of air to aqueous medium, foams in the desired range of wet density are readily obtained. The beating, whipping or whisking methods of air entrainment used for making most fine creamy foams are not suited because they make either random sizes or extremely small bubbles, resulting in final dried foams having excessive densities and/or inferior physical properties.

In order to attain the necessary low densities, it is preferred to generate foams having wet densities in the range of 1 to 5 lb./cu. ft., in solutions having polymer contents of 0.5 to 5%. To attain the necessary densities, it is evident that if higher polymer solution concentrations are used then wet foam must be generated at lower densities; or if higher wet densities are used, then the polymer concentration must be proportionately lower. When using certain types of foaming equipment, control over the wet foam density can conveniently be obtained by passing the foam, while in the ungelled condition, into a disengaging zone where the excess fluid medium separates. This may be accomplished, for example, by passing the ungelled foam vertically upward or at an upward angle through a column or vessel of substantial cross-section so that the foam has a residence time therein of ½ to 5 minutes, and returning the fluid medium drained out of the foam in the column back to the foam generating zone. By varying the column size and/or generating rate, the amount of drainage and hence the wet density of the foam may thus be adjusted to the desired value.

A specific embodiment of apparatus which is suitable for laboratory generation of foam and which can be readily scaled up to greater capacity, foam-generating apparatus consists of a vertically disposed vessel having a middle cylindrical section about 6 inches in diameter and 5.5 inches long, and frustoconical sections above and below the cylindrical section. The upper frustoconical section is approximately 4.5 inches long and terminates in a 1 inch diameter exit tube through which the wet foam exudes. The lower frustoconical section is about 7 inches long and terminates in a cylindrical section approximately 2 inches long and 2 inches in diameter. The exit from this lower cylindrical section is adapted to receive an air injection plate to which air is supplied at a pressure up to 5 lb./sq. in. The air injection plate is stainless steel, about 0.030 inch thick and has nineteen 0.008 inch diameter holes spaced 0.25 inch apart. Alternate air injection plates with different hole sizes and/or arrangements can be readily installed. The lower cylindrical section is provided with an inlet for the aqueous medium to be foamed. The total volume of the vessel between the air injection plate and the exit tube is about 4 liters.

During foam generation, the level of aqueous medium is maintained at about 5 inches above the air injection plate. This corresponds to a liquid volume of about 0.4 liter. The free space above the liquid level, which functions as a disengaging zone, thus amounts to about 3.6 liters. By means of a throttle valve in the air line leading to the air injection plate, the flow of air through the generator is controlled at the level suitable for this specific apparatus, namely about 1 to 2 liters per minute. The apparatus may be maintained at any desired temperature by placing it in a housing through which air or water at that temperature is circulated. The air used to generate the foam should be passed through a water-saturator within the housing before entry into the generator. This is required to eliminate the slight tendency of the holes in the air injection plate to plug.

When using systems based upon a rapid gelation reaction, it is preferable to flow the aqueous media in thin streams or films past orifices through which air is introduced. In apparatus of this type, no disengaging zone is required. The wet density of the resulting foam can be varied considerably by changing the ratio of air to aqueous medium. This is useful, for example, when insulating an entire house, because a relatively higher wet density and the accompanying greater mobility of the foam is desirable when insulating a horizontal surface such as the floor surface of an attic, whereas a relatively lower wet density and the accompanying lesser mobility of the foam is desirable when insulating a vertical surface where only partial support is provided, such as the space between the studs in the wall of a building.

The water-soluble polymer and controllable gel agent therefor may be used with no other necessary constituents other than water to prepare light acoustic closed-cellular materials at the specific cell size range and densities. However, to prepare cellular materials of low density with the best thermal insulating effects, I prefer to disperse in the aqueous medium to be foamed certain pigments which strongly absorb infrared radiation in the wave length band of 5 to 25 microns, or alternatively, pigments which have high reflectance in this same wave length band. It has been known that such infrared transmission control agents have moderate effects, such as 20%, on thermal conductivity of conventional cellular insulation, but they have much larger beneficial effects, as high as 80% or more, when uniformly dispersed throughout the cellular products of this invention. Pigments for this purpose may be selected by conventional infrared reflection and absorption measurements, or by use of similar data from the literature on light absorption and reflection. Aluminum powder and carbon black are examples of suitable infrared transmission control agents in particulate form.

The amount of pigmentation relative to the polymeric materials, is conveniently chosen, depending on the pigment, to provide adequate enhancement of resistance of conduction of heat. Preferably, the nature and the amount of the particulate infrared transmission control agent should be such that the amount of infrared radiation which is transmitted by the pigment-containing foam is at least 50% less than that transmitted by an unpigmented but otherwise identical foam. Large excesses are to be avoided since they weaken the cellular structure unduly, and may make it excessively permeable to water vapor. A preferred range of pigmentation is one in which the infrared transmission control agent constitutes 20 to 70% by weight of the dry foam, or in which the foam contains 0.02 to 0.2 lb. of infrared control agent per cubic foot.

These pigments must be finely ground in order to be contained in the thin cell walls of the dry foams. Pigment dispersing agents are frequently necessary in order to obtain optimum results. Salts of sulfonated lignin are among the agents known to disperse carbon in water vehicles. Congo red is also a powerful dispersing agent for carbon.

The aqueous medium suitable for conversion into a stable, wet, closed-cell foam structure which will dry to a light-weight, closed-cell insulating material thus comprises, as essential ingredients, water, a water-soluble organic polymer, a gelling agent for the polymer (or the precursor to such a gelling agent), and particles of an infrared transmission control agent. In instances where the actual foaming operation will not occur for quite some time, it may be necessary to keep one or several of the ingredients in a separate container to prevent premature reaction. For example, where the gelation is initiated by a change in the oxidation state or the pH, the aqueous medium will contain the precursor to the actual gelation agent, such as the reduced or oxidized form of the gelation agent; and the activating reagent will be kept separate. In instances where it is desired to minimize the weight of materials to be shipped, it is possible to utilize a concentrate of the above ingredients or an intimate, dry mixture of a water-soluble organic polymer, a thermally reversible gelling agent for the polymer and/or an infrared transmission control agent. The aqueous medium to be foamed may then be prepared at the site of use by dispersing the dry mixture in water and heating to effect solution of the water-soluble ingredients. A dry mixture comprising a water-soluble organic polymer capable of forming a gel structure in an aqueous medium, which is inclusive of polymers which, either by themselves or in combination with gelling agents, can form gel structures under controllable conditions, and an infrared transmission control agent may be utilized in like manner for the preparation of the aqueous medium to be foamed. For applications where excellent insulating properties are not required, e.g., in acoustical applications, the dry mixture may comprise, as essential ingredients, a water-soluble organic polymer and a thermally reversible gelling agent for the polymer. The ingredients of these dry mixtures are in particulate form and are present in the proportions desired in the final foam structure.

In addition to the essential or preferred constituents noted above, other additives may be present in the aqueous medium to be foamed. For example, foaming or foam-stabilizing agents may be used. However, this type of agent should not be used indiscriminately. For example, in the case of the polyvinyl alcohol-Congo red system, I find that sodium lauryl sulfate, a well-known foaming agent, facilitates the initial formation of foam, however, it also facilitates its eventual destruction or spontaneous collapse. In general, it is highly desirable, when the polymer is polyvinyl alcohol, to completely exclude the low molecular weight, i.e., non-polymeric, surface active agents of the usual water-foaming type.

In some cases auxiliary thickening agents may be desirable for temporary foam stabilization, before gel formation occurs. However, very high viscosity of the solution is to be avoided because it results in excessive entertainment of liquid in the foam, and slow disengagement of liquid therefrom, resulting finally in too dense foams within the cell size range I have specified.

Various reagents which are known to cause insolubilization of films of the polymer during drying may be incorporated in the foam liquid. These can be used to make the final cellular structure resistant to damage by accidental exposure to liquid water. Also, various known fire and flame-preventive agents may be added. For example, 10% of boric acid on a dry basis in a composition having about 40% of boric acid on a dry basis in a composition having about 40% carbon, 40% polyvinyl alcohol and 10% Congo red resulted in a cellular structure which was self-extinguishing after ignition and removal of the flame.

Boric acid can be used in amounts of about 2 to 4% of dry weight, when the pigment is carbon, to make the dry insulating material noncombustible. It is not effective when no carbon is present. However, alkali or ammonium phosphates at about the same concentration are effective in flame-proofing even in the absence of carbon.

Plasticizers such as ethylene glycol and polyethylene glycol, of molecular weight about 200, were found alone to have little effect at low concentrations (e.g., about 20% of polymer weight). At high concentrations such as 100–150% of polymer weight, they caused the dried polyvinyl alcohol-Congo red cellular materials to become soft or sticky. However, at these high concentrations, with also the presence of boric acid, in amount of about 1% to 4% of the polymer, and also the pH of the foam liquid at about 5–7, the resultant dried cellular materials were found to have a surprising degree of elastic resilience. This property may be desirable to lessen the chance of accidental damage to the insulating material. Substantial resilience was also found in the presence of the stated high concentration of plasticizers when the gelling was effected by tetravalent titanium even in the absence of boric acid.

The combination of glycerol plasticizer and boric acid and liquid pH 5–7 mentioned above was also found to confer a considerable resistance to any damage as a result of freezing the fresh wet foam at —20° C. In this case, the concentration of glycerol (about 2% of the whole solution) was far too small to function as an antifreeze, and in fact the wet foam froze solid. However, after thawing it retained its closed cellular structure, and dried without visible damage. In contrast, a similar wet foam which did not contain these additives virtually collapsed during drying after exposure to the same severe freezing condition.

Rodent repellents and bactericidal and fungicidal preservatives may be incorporated as desired. Fibrous, insoluble constituents, such as bentonite, kaolin, short asbestos, glass fibers, textile fibers, and/or wood fibers may be used to increase strength while maintaining the overall density of the cellular product below 0.3 lb./cu. ft.

In stating preferred densities above, I refer to densities as determined by weighing in air. For example, a cellular structure having a stated density of 0.05 lb./cu. ft. actually contains, per cubic foot, 0.05 lb. of solid and 0.09 of air. Where highly pigmented cellular structures are mentioned, I may refere to two densities. The total density is the measured weight divided by the measured volume. The polymer density is the total density times the fraction of the dry cellular material which is water-soluble polymeric material plus gelling agent.

There are many ways to define cell size of cellular materials. Actual cellular materials are always composed of varied shaped cells with varied shaped walls. Even in the more uniform cellular materials, there is also some variation from cell to cell. The most typical cell, however, is a 14-faced polyhedron with almost flat faces; the most typical face is a pentagon, although there are some 4- and 6-sided, fewer 3- and 7-sided, etc. The cell-size measure I use is secured in the following manner. A cellular material is generated and placed in a glass-walled vessel. A scale is taped to the vessel, and an enlarged photograph is taken. Measurements are made from this photograph of the perpendicular distance from one cell face border to the opposite cell face border (if a hexagon) or to the opposite apex (if a pentagon). Many cell faces are measured thus, and the average is taken. This method of measurement is convenient, reliable and reproducible, and serves to define the cell size for the practice of this invention. Other cell-size definitions may be related to this by geometric principles. For example, the "diameter," which is the longest line which can be inscribed in the polyhedral cell, is about 1.6 times the cell size defined above.

In the practice of this invention, as uniform as possible cell sizes are preferred. Thus, the range 0.06 to 0.4 inch does not mean a nonuniform cellular material, but rather a variety of uniform cellular materials whose average cell size may be as low as 0.06 inch or as high as 0.4 inch. Within the cell size range stated, it is generally found that the smaller the cell size the better the insulating efficiency. However, near the lower end of this range it becomes difficult to maintain the essential low densities. At the upper end of this cell size range the insulating efficiency tends to fall below a practically useful level.

Advantages of these exceptionally light cellular structures have been found in addition to the low material cost per unit volume, which derives from extremely efficient usage of polymeric material in the light cellular form. One example is good resistance to damage from building vibration. Another is good adhesion to walls of building voids, without sagging, clumping or settling, which might be caused by gravity at higher densities. Another is reduction in weight and volume of materials to be shipped, moved and handled for the purpose of insulation. Weight reduction of the whole building structure, by choice of these extremely light cellular products, is especially an advantage in shipping of prefabricated building sections. Good acoustic properties may also be related to the low densities of cellular material produced by this invention. While these materials are strong enough to retain their position in building voids indefinitely, they may also be very readily broken through when and where desired, as for example for installation of additional electrical wiring. The process for placing these insulating materials also results in very effective sealing of cracks, holes and pores in all kinds of wall and ceiling constructions, thus minimizing seepage of wind and dust, which is a problem with currently used systems involving fibrous insulating materials even when so-called vapor barriers are employed.

The preferred embodiment of this invention results in cellular materials of extraordinarily low polymer density of 0.01 to 0.2 lb./cu. ft. in the cell size range of 0.06 to 0.4 inch. At densities below the lower limit stated, while cellular products can be made, they are not expected to possess adequate stability for long periods in which atmospheric pressure changes may ultimately be large and sudden enough to damage the cellular structure. At polymer densities higher than 0.2 lb./cu. ft., many of the advantages of these light insulating materials are progressively lost. In fact the most preferred embodiment for best results requires polymer densities not exceeding 0.1 lb./cu. ft. Advantages have been described which make these cellular products most especially adapted for new and better practice of architectural insulation and acoustic control. They are also useful for the packaging of light weight, delicate materials. It is also possible by using more concentrated polymer solutions, e.g., 10%, in the process of this invention to make cellular products which are similar to the above, except that they have polymer densities as high as 0.5 lb./cu. ft., at uniform cell sizes in the range of 0.06 to 0.4 inch. These higher densities from 0.2 to 0.5 lb./cu. ft. are not well suited for use as insulating or acoustical materials, but they are stronger materials and are useful for the other purposes where conventional closed-cell materials having densities of 1 to 3 pounds per cubic foot are commonly used.

The invention is further illustrated by the examples in which all parts and percentages are on a weight basis.

EXAMPLE 1

This example illustrates a convenient way to prepare a foam, and also some of the common properties of aqueous foams, but does not represent an embodiment of this invention.

Foams were prepared by passing air at various pressures up to about 5 lb./sq. in. gauge pressure through one or more orifices into a 4.5% aqueous, high molecular weight polyvinyl alcohol solution, allowing the bubbles to rise through the solution, and exude through a pipe as a wet cellular foam. The polyvinyl alcohol used was a completely hydrolyzed (>99%) grade having a 4% aqueous solution viscosity of 55-65 centipoises. By variation of orifice sizes and air pressure, it was possible to control the wet foam cells to be reasonably uniform in size, at any chosen cell size from 0.06 to 0.4 inch. By multiplying the number of orifices, all of the same size, while maintaining the same air pressure applied to them, it was practical to multiply proportionately the rate of foam generation to any desired degree. The excess liquid in the foam was drained and returned for reuse by causing the foam to pass upward through a disengaging zone before exuding the foam for use. Thus, as the bubbles rise, the excess liquid flows back to the body of polyvinyl alcohol solution where the foam is generated.

Specimens of the foam were collected in various containers and evaluated further. It was found that relatively stable wet foams were formed, a consequence of the choice of this particular water-soluble polymer and concentration of solution. However, when shallow containers (one inch deep) were filled with the foam and exposed to the air, some of the liquid drained to the bottom of the containers, and the remainder dried to a rigid, slightly elastic, cellular structure. When deeper containers (four inches deep) were filled and similarly exposed to air, only the top dried to a crust of cellular structure. Lower in the container, the cellular structure broke down and resulted in a mass of liquid, or, finally, dried non-cellular polymer resting on the bottom of the container. Even when placed in shallow containers, the cellular structure substantially collapsed and disintegrated to form a non-cellular liquid mass when drying by evaporation of water was prevented for a period of 24 hours. When wet cellular foam was placed in a thin layer on a porous cellulosic material such as thick layers of paper, and immediately exposed to air, the cellular mass rapidly broke down and the material soaked deeply into the paper.

EXAMPLE 2

An aqueous solution having the composition 3.00% polyvinyl alcohol (same grade as used in Example 1), 0.5% Congo red, balance water, was prepared by stirring the constituents together at 90–100° C. The aqueous solution can also be prepared by dispersing a dry mixture of polyvinyl alcohol and Congo red, both in particulate form, and then heating at 90–100° C. The solution was cooled to about 40° C. A foam was generated as in Example 1, the temperature being maintained at about 40° C. The cell size of the foam was about 3/16 inch. The wet foam which exuded from the exit-pipe of the generator was found to have a wet gross density of 1.8 lb./cu. ft. After drying, the resulting cellular product was found to have a density of 0.06 lb./cu. ft. It was a transparent, red, cellular, rigid-elastic material with surprising strength, considering the extremely low density.

Various tests were made on the wet foam and the final dry cellular product. Corrugated cardboard boxes were filled with foam and allowed to stand. There was no soaking of the cardboard structure, nor did any liquid exude from seams of the box, although the cellular material wetted and ultimately bonded very strongly to the cardboard surface. The material dried to a rigid-elastic cellular structure completely uniform throughout the box. A specimen of wet foam was deposited on a double layer of paper toweling. After drying it was found that the cellular structure had remained fully stable. The top layer of toweling was wetted and colored red by the foam liquid, but virtually no material had penetrated to the second layer of paper towelling. A specimen of fresh wet foam placed in a hermetically sealed glass container maintained a completely stable cellular structure, even though evaporation was completely prevented, for the essential period of about 24 hours, and in fact also for over six weeks.

It was noted that masses of the dried cellular product have a readily apparent influence in deadening sound and noise. Thermal conductivity measurements were made in the range 40–100° C. by a modified Northrup method, resulting in a calculated thermal conduction coefficient K of about 0.97 B.t.u. inch/hr. sq. ft. ° F. This indicates a useful degree of thermal insulating effect, although less than that of the best present commercial insulating materials.

EXAMPLE 3

A 3.00% polyvinyl alcohol (same grade as in Example 1) solution containing 0.5% Congo red was prepared as in Example 2. Three percent by weight, based on the polyvinyl alcohol solution, of a readily water-dispersible grade of aluminum flake powder was dispersed in the solution at a temperature of about 40° C. Foam was generated as in Example 2, having a similar cell size. The wet foam had a density in the wet state of 2.85 lb./cu. ft. After drying, the density was found to be 0.19 lb./cu. ft. The product was a rigid-elastic cellular material with a bright coppery-red metallic appearance, and surprising strength and toughness, considering the extreme lightness. Tests on the fully wet foam showed excellence similar to that in Example 2 with regard to absence of drainage, absence of soaking into porous materials, and stability of cellular structure even in sealed containers for at least 24 hours, and in fact for over six weeks. Thermal conductivity tests showed that the conductivity coefficient, measured at about 40 to 100° C., was about 0.36 B.t.u. inch/hr. sq. ft. ° F. Since this was fully comparable in cell size to the product of Example 2, it is noted that aluminum pigment, which is a reflector for ambient infrared radiation, improves the conductivity coefficient by reducing it, in this case by about 63%. By varying the cell size and the pigment dispersion, conductivity coefficients in the range of 0.37 to 0.27 have been obtained with the system.

EXAMPLE 4

A solution was prepared containing 1.50% polyvinyl alcohol (same grade as in Example 1), 0.125% of a commercial polysaccharide thickener (Abbott Laboratories B 1459), 0.1% sodium acetate ($NaO_2CCH_3 \cdot 3H_2O$), 0.12% acetic acid, and 0.15% Congo red. To the above solution was added 1.5% of lampblack, a pigment which absorbs infrared radiation. In this example, the polysaccharide was added to adjust viscosity and improve foaming tendency. The acetate buffer was added to improve the gel speed and gel strength of the polyvinyl alcohol-Congo red system.

A foam was prepared and tested as in previous examples, except that by using smaller capillary air-orifices there resulted a smaller cell size, namely, a uniform cell group having an average cell size of 0.123 inch. The foam, when properly drained and discharged from the generator, was found to have a wet density of 1.55 lb./cu. ft. After drying, it was found to have a total density of 0.052 lb./cu. ft., or a calculated polymer density of about 0.027 lb./cu. ft. The wet foam had the same excellent characteristics as those of Examples 2 and 3 with regard to stability, drainage, and resistance to soaking into porous materials. It was used successfully to fill test sections of typical residential construction composed of wood studs, gypsum dry wallboard, cellulose fiberboard sheathing and wood siding. No adverse effects were observed on any of the materials either when first installed or after completion of natural drying. The dried cellular product was black, somewhat delicate, but amply strong for resistance against vibration. It resisted, with no visible effects, sudden changes in atmospheric pressure of about 4 inches of mercury, which is about the limit of local extreme pressure variations in the earth's atmosphere. Thermal conductivity measurements showed the conductivity at 40–100° C. to be about 0.34 B.t.u. in./hr. sq. ft. ° F. Thus, this extremely light material is practically equivalent to the most widely used commercial insulating materials, although its density is less by a factor of 50 or more. By varying the cell size and the carbon dispersion, conductivity coefficients in the range of 0.34 to 0.24 have been obtained with this system.

EXAMPLE 5

This example illustrates the use of an oxidation type of gelling system.

To a solution of polyvinyl alcohol (same grade as in Example 1) was added a dispersion of lampblack in water containing Marasperse N, a sodium salt of a lighnin sulfonic acid, and sodium nitrate, to result in a composition "A" containing:

| | Percent |
|---|---|
| Polyvinyl alcohol | 2.67 |
| Lampblack | 2.62 |
| Marasperse N | 0.065 |
| Sodium nitrate, $NaNO_3$ | 0.31 |

Separately, to water was added sodium acetate and a commercial 20% solution of titanous chloride, to result in a solution "B" containing 0.79% $TiCl_3$ and 0.79% $NaO_2C \cdot CH_3 \cdot 3H_2O$. Composition "A" and solution "B" were pumped in a volume ratio of 3 "A":1 "B" through an air mixing device in which air was incorporated with the mixture. 3.0 liters per minute of foam generated having a wet density of 1.84 lb./cu. ft. After drying, the resulting black cellular product was found to have a thermal conductivity of 0.26 B.t.u. in./hr. ft.² ° F. Somewhat better control of the gelling can be obtained by using nitrogen gas instead of air, because the trivalent titanium is sensitive to air oxidation.

EXAMPLE 6

This example illustrates the use of a gelling system based upon a change of pH.

A titanium complex solution was prepared at room temperature containing 0.25% oxalic acid $H_2C_2O_4 \cdot 2H_2O$ and 7.09% potassium titanium axalate $K_2Ti(OH)_2(C_2O_4)_2 \cdot H_2O$. A carbon dispersion was prepared by grinding 180 gm. lampblack and 4.5 gm. Marasperse N (sodium lignin sulfonate), then diluting to 2500 gm. A polyvinyl alcohol solution was prepared with 24 gm. sodium oxalate $Na_2C_2O_4$, 3180 gm. polyvinyl alcohol (same grade as used in Example 1), and 49.7 liters of water. This was heated to dissolve at 90–100° C. for an hour with stirring. After cooling, the pH was adjusted to 6.0–5.8 with a little hydrochloric acid. Composition "A" was made by mixing 5815 gm. of the carbon dispersion, 105 gm. of 20 vol. percent acetic acid, 5270 gm. of the polyvinyl alcohol solution, and 720 gm. of the titanium complex solution. Solution "B" was made by dissolving 42.8 gm. sodium oxalate $Na_2C_2O_4$ and 66.9 gm. sodium bicarbonate $NaHCO_3$ in 1890 ml. water.

Composition "A" and solution "B" were mixed and foamed in a ratio and with equipment similar to that in Example 5. It yielded similar results, except that it was notably a stronger gel in the wet state, and yet the foam gun could be stopped and restarted without causing any plugging of the equipment by gelled material. Although the mixture of two liquids gels in about 6 minutes in mass, the gelling is actually much more rapid in the foam, because escape of $CO_2$ into the foam air increases pH, accelerating gelling. The gelling rate can be increased or decreased by decreasing or increasing, respectively, the free oxalate concentration.

EXAMPLE 7

This example illustrates the use of a gelling system based upon a change of pH which is brought about by liberation of carbon dioxide gas into the void spaces in the newly formed foam.

A 0.2 molar solution of $K_2Ti(OH)_2(C_2O_4)_2 \cdot H_2O$ was made by stirring together 7.09 parts by weight of commercial potassium titanate oxalate, 0.25 part by weight of oxalic acid $H_2C_2O_4 \cdot 2H_2O$, and 92.66 parts by weight of water. The commercial titanium salt had an analysis of 14.1% Ti, 17.4% K, 14.1% C, and 1.3% H. With this, a solution "A" was made containing 2.65% of a commercial high molecular weight polyvinyl alcohol; 0.02% sodium oxalate $Na_2C_2O_4$; 0.015% oxalic acid $H_2C_2O_4 \cdot 2H_2O$; 0.18% of acetic acid; and 0.428% $K_2Ti(OH)_2(C_2O_4)_2 \cdot H_2O$, equivalent to .012 mole per liter. This "A" solution was heated to 90–100° C. to dissolve the polymer, and then cooled. It was a liquid having pH of about 4.0.

A solution "B" was prepared containing 0.08 mole per liter of $Na_2C_2O_4$; 0.348 mole per liter and $NaHCO_3$; 0.116 mole per liter of boric acid $H_3BO_3$; and 12 wt. percent glycerol. The glycerol and boric acid were used to modify the final buffer pH. To 3 parts by volume of "A" was added 1 part by volume of "B." The mixture was stirred. Within about six minutes the mixture had increased in viscosity but it had not gelled, but remained as a liquid except for a gelled skin on the top surface where exposed to air. A foam was blown in this liquid by passing air bubbles through a capillary tube under the surface of the liquid. The head of foam was found to be extremely stable, and by breaking it down mechanically it was found to consist of a firm elastic gel. Meanwhile the remaining liquid, not incorporated in a foam, remained liquid. When placed in a closed container, it was still a liquid after several days, and yet retained the property of yielding a gelled foam when blown with air.

EXAMPLE 8

This example illustrates the preparation of a strong, dry foam based upon an acrylamide polymer.

A solution "A" was prepared by adding to 975 ml. of water, 26.4 g. of a commercial high molecular weight polyacrylamide containing roughly 1% acrylic acid comonomer ("Separan" NP–10), 2.1 g. of hydroxylamine hydrochloride, and 0.2 g. of "Igepon AP–75" (oleic acid ester of 2-hydroxyethane sodium sulfonate), a commercial surfactant. A "B" solution contained 4.0 g. of $Na_2Cr_2O_7 \cdot 2H_2O$, 5.0 g. of "Dupinol ME," a sodium salt of an alkyl sulfate, and 493 ml. of water.

Solutions "A" and "B" were pumped in a volume ratio of 3 "A":1 "B" through an air mixing device containing a capillary tube in which air was incorporated with the mixture. The resulting foam dried to a cellular structure having a density of 0.094 lb./ft.$^3$.

The dry foams obtained in accordance with all of the foregoing examples had average cell sizes in the range of 0.06 to 0.4 inch, and, with the exception of the ungelled foam of Example 1, they were strong enough to withstand normal atmospheric pressure changes of 4 inches of mercury or more.

As used herein and in the ensuing claims, an expression such as "dry, closed-cell foam" or "dry mixture" connotes that the composition contains only an amount of moisture that is roughly in equilibrium with the water vapor in the surrounding atmosphere; it does not connote a bone-dry condition. Actually, the foams of this invention tend to pick up and lose moisture with changes in the relative humidity of the surrounding atmosphere.

The expression "gelling agent" as used in the ensuing claims includes not only the actual active species of the gelling agent, for example, the freshly formed and non-complexed tetravalent titanium, but also the immediate precursors thereof, for example, the trivalent titanium salts which need only the presence of a suitable oxidant to initiate gelling or the complexed titanium compounds which need only a change in pH to initiate gelling.

The compositions of this invention are designed primarily for insulation applications, but it is to be understood that they may also be employed for acoustical and packaging purposes and for other uses in which light foams are customarily employed.

I claim:
1. A dry, essentially closed-cell foam comprising an organic polymer composition derived from
   (a) organic polymer consisting essentially of polyvinyl alcohol and
   (b) gelling agent which is capable of gelling said polyvinyl alcohol in aqueous medium to a non-flowable gel structure in no less than a few seconds and no more than a few minutes, and which is selected from the group consisting of
      (1) thermally reversible gelling agents which do not gel the polyvinyl alcohol at a temperature of at least 40° C., but do gel the polyvinyl alcohol in aqueous medium upon cooling below 40° C.,
      (2) compounds of a metal in a valence state in which it does not gel the polyvinyl alcohol, in conjunction with a substance which is capable of changing the valence state of the metal to one in which it does gel the polyvinyl alcohol, and
      (3) complex salts of a metal in a valence state in which it would gel the polyvinyl alcohol if it were not in complexed form, in conjunction with a substance which is capable of destroying the complex salt, said foam having
      (1) an average cell size of 0.06 to 0.4 inch,
      (2) 0.01 to 0.2 lb. of gelled polyvinyl alcohol per cubic foot, and
      (3) a pneumatic compressive strength of at least 4 inches of mercury.

2. The dry foam of claim 1 in which the polyvinyl alcohol consists essentially of fully hydrolyzed polyvinyl alcohol having a 4% aqueous solution viscosity of 55–65 centipoises.

3. The dry foam of claim 1 which also contains 20 to 70% by weight of a particulate infrared transmission control agent selected from the group consisting of aluminum powder and carbon black.

4. The dry foam of claim 1 in which the gelling agent is Congo red.

5. The dry foam of claim 1 in which the gelling agent is selected from the group consisting of
   (1) water soluble trivalent titanium compounds and water-soluble divalent iron compounds, in conjunction with a water-soluble oxidizing agent which is capable of converting the compound to the next higher valence state,
   (2) water-soluble hexavalent chromium compounds and water-soluble pentavalent vanadium compounds, in conjunction with a water-soluble reducing agent which is capable of converting the compound to a lower valence state, and
   (3) water-soluble tetravalent titanium complexes selected from the group consisting of titanium complexes of hydroxy acids, alkali fluotitanates, and oxalates of titanium, in conjunction with sufficient alkaline reagent to convert the pH of the aqueous medium to a pH in the range of 7–9, thereby destroying the complex.

6. The dry foam of claim 5 in which the gelling agent is a trivalent titanium compound, in conjunction with an oxidizing agent which is capable of converting the trivalent titanium compound into a tetravalent titanium compound.

7. The dry foam of claim 5 in which the gelling agent is an oxalate complex of tetravalent titanium.

8. A wet, non-flowable, essentially closed-cell foam comprising an aqueous medium containing a gelled organic polymer composition derived from
   (a) organic polymer consisting essentially of polyvinyl alcohol and
   (b) gelling agent which is capable of gelling said polyvinyl alcohol in aqueous medium to a non-flowable gel structure in no less than a few seconds and no more than a few minutes, and which is selected from the group consisting of
      (1) thermally reversible gelling agents which do not gel the polyvinyl alcohol at a temperature of at least 40° C., but do gel the polyvinyl alcohol in aqueous medium upon cooling below 40° C.,
      (2) compounds of a metal in a valance state in which it does not gel the polyvinyl alcohol, in conjunction with a substance which is capable of changing the valence state of the metal to one in which it does gel the polyvinyl alcohol, and
      (3) complex salts of a metal in a valence state in which it would gel the polyvinyl alcohol if it were not in complexed form, in conjunction with a substance which is capable of destroying the complex salt, said foam having
      (1) an average cell size of 0.06 to 0.4 inch, and (2) 0.01 to 0.2 lb. of gelled polyvinyl alcohol per cubic foot.

9. The wet foam of claim 8 in which the aqueous medium contains 0.5 to 5% by weight of gelled polyvinyl alcohol.

10. The wet foam of claim 9 in which particles of infrared transmission control agent selected from the group consisting of aluminum powder and carbon black are dispersed throughout the aqueous medium.

11. The wet foam of claim 10 which contains 0.02 to 0.2 lb. of said infrared transmission control agent per cubic foot.

12. The wet foam of claim 9 in which the gelling agent is Congo red.

13. The wet foam of claim 9 in which the gelling agent is selected from the group consisting of
   (1) water-soluble trivalent titanium compounds and water-soluble divalent iron compounds, in conjunction with a water-soluble oxidizing agent which is capable of converting the compound to the next higher valence state,
   (2) water-soluble hexavalent chromium compounds and water-soluble pentavalent vanadium compounds, in conjunction with a water-soluble reducing agent which is capable of converting the compound to a lower valence state, and
   (3) water-soluble tetravalent titanium complexes selected from the group consisting of titanium complexes of hydroxy acids, alkali fluotitanates, and oxalates of titanium, in conjunction with sufficient alkaline reagent to convert the pH of the aqueous medium to a pH in the range of 7–9, thereby destroying the complex.

14. The wet foam of claim 13 in which the gelling agent is a trivalent compound, in conjunction with an oxidizing agent which is capable of converting the trivalent titanium compound into tetravalent titanium compound.

15. The wet form of claim 13 in which the gelling agent is an oxalate complex of tetravalent titanium.

16. A process for the production of a low density, dry, essentially closed-cell foam structure which comprises
   (A) generating a wet foam by admixing a gas with a fluid aqueous medium containing
      (1) water,
      (2) organic polymer consisting essentially of polyvinyl alcohol and
      (3) gelling agent which is capable of gelling said polyvinyl alcohol in aqueous medium to a non-flowable gel structure in no less than a few seconds and no more than a few minutes, and which is selected from the group consisting of
         (1) thermally reversible gelling agents which do not gel the polyvinyl alcohol at a temperature of at least 40° C., but do gel the polyvinyl alcohol in aqueous medium upon cooling below 40° C.,
         (2) compounds of a metal in a valence state in which it does not gel the polyvinyl alcohol, in conjunction with a substance which is capable of changing the valence state of the metal to one in which it does gel the polyvinyl alcohol, and
         (3) complex salts of a metal in a valence state in which it would gel the polyvinyl alcohol if it were not in complexed form, in conjunction with a substance which is capable of destroying the complex salt,
   said wet foam having
      (a) a cell size of 0.06 to 0.4 inch, and
      (b) a density of 1 to 5 lbs. per cubic foot,
   (B) allowing said gelling agent to gel said polyvinyl alcohol to a non-flowable gel structure after the foam has been generated, and
   (C) allowing said foam to dry by loss of water vapor, thereby forming a dry foam having
      (1) an average cell size of 0.06 to 0.4 inch,
      (2) 0.01 to 0.2 lb. of gelled polyvinyl alcohol per cubic foot, and
      (3) a pneumatic compressive strength of at least 4 inches of mercury.

17. The process of claim 16 in which the aqueous medium contains 0.5 to 5% by weight of polyvinyl alcohol.

18. The process of claim 17 in which the aqueous medium also contains 20 to 70% by weight of a particulate infrared transmission control agent selected from the group consisting of aluminum powder and carbon black.

19. The process of claim 17 in which the gelling agent is a thermally reversible gelling agent, said aqueous medium is at a temperature of at least 40° C. during generation of the wet foam, and said wet foam is cooled below 40° C., thereby causing the polyvinyl alcohol to gel.

20. The process of claim 19 in which the gelling agent is Congo red.

21. The process of claim 17 in which the gelling agent is selected from the group consisting of
   (1) water-soluble trivalent titanium compounds and water-soluble divalent iron compounds, in conjunction with a water-soluble oxidizing agent which is capable of converting the compound to the next higher valence state,
   (2) water-soluble hexavalent chromium compounds and water-soluble pentavalent vanadium compounds, in conjunction with a water-soluble reducing agent which is capable of converting the compound to a lower valence state, and
   (3) water-soluble tetravalent titanium complexes selected from the group consisting of titanium complexes of hydroxy acids, alkali fluotitanates, and oxalates of titanium, in conjunction with sufficient alkaline reagent to convert the pH of the aqueous medium to a pH in the range of 7–9, thereby destroying the complex.

22. The process of claim 21 in which the gelling agent is a trivalent compound, in conjunction with an oxidizing agent which is capable of converting the trivalent titanium compound into a tetravalent titanium compound.

23. The process of claim 21 in which the gelling agent is an oxalate complex of tetravalent titanium.

24. A process for the production of a low density, dry, essentially closed cell foam structure which comprises
   (A) generating a wet foam by admixing a gas with a fluid medium containing
      (1) water,
      (2) organic polymer consisting essentially of polyvinyl alcohol and
      (3) gelling agent which is capable of gelling said polyvinyl alcohol in aqueous medium to a non-flowable gel structure in no less than a few seconds and no more than a few minutes, and which is selected from the group consisting of
         (1) thermally reversible gelling agents which do not gell the polyvinyl alcohol at a temperature of at least 40° C., but do gel the polyvinyl alcohol in aqueous medium upon cooling below 40° C.,
         (2) compounds of a metal in a valence state in which it does not gel the polyvinyl alcohol, in conjunction with a substance which is capable of changing the valence state of the metal to one in which it does gel the polyvinyl alcohol, and
         (3) complex salts of a metal in a valence state in which it would gel the polyvinyl alcohol if it were not in complexed form, in conjunction with a substance which is capable of destroying the complex salt,
   said wet foam having a cell size of 0.06 to 0.4 inch, (B) passing the wet foam into a disengaging zone where excess aqueous medium is separated leaving a wet foam with a density of 1 to 5 lbs. per cubic foot,
(C) conveying the wet foam to a confining zone,
(D) allowing said gelling agent to gel said polyvinyl alcohol to a non-flowable gel structure after the foam has been generated,
(E) allowing said foam to dry by loss of water vapor, thereby forming a dry foam having
    (1) an average cell size of 0.06 to 0.4 inch,
    (2) 0.01 to 0.2 lb. of gelled polyvinyl alcohol per cubic foot, and
    (3) a pneumatic compressive strength of at least 4 inches of mercury.

25. The process of claim 24 in which the aqueous medium contains 0.5 to 5% by weight of polyvinyl alcohol.

References Cited

UNITED STATES PATENTS

| | | |
|---|---|---|
| 2,155,658 | 4/1939 | Hermann et al. |
| 2,162,618 | 6/1939 | Izard. |
| 2,332,460 | 10/1943 | Muskat et al. |
| 2,362,026 | 11/1944 | Quist. |
| 2,876,085 | 3/1959 | Horie _____ 260—2.5 |
| 2,673,723 | 3/1954 | Keen. |
| 2,720,468 | 10/1955 | Shacklett. |
| 3,017,282 | 1/1962 | Brill. |
| 3,318,856 | 5/1967 | Deyrup _____ 260—2.5 |

MURRAY TILLMAN, Primary Examiner

M. FOELAK, Assistant Examiner

U.S. Cl. X.R.

260—17.4, 33.2, 41, 91.3

PO-1050
(5/69)

UNITED STATES PATENT OFFICE
CERTIFICATE OF CORRECTION

Patent No. 3,492,250     Dated January 27, 1970

Inventor(s) Alden J. Deyrup

It is certified that error appears in the above-identified patent and that said Letters Patent are hereby corrected as shown below:

Col. 2, Line 7, "In solubilizers" should be -- Insolubilizers".
Col. 4, Line 43, "means" should be -- mean --; Line 48, "poyvinyl" should be -- polyvinyl --; Line 64, after "borax" insert -- gel begins --. Col. 7, Line 20, after "then" insert -- the --. Col. 9, Line 39, "entertainment" should be -- entrainment --; Lines 49 and 50, delete "of boric acid on a dry basis in a composition having about 40%". Col. 10, Line 24, after "0.09" insert -- lb. --; Line 26, "refere" should be -- refer --. Col. 13, Line 66, "lighnin" should be -- lignin --. Col. 14, Line 20, "axalate" should be -- oxalate --; Line 69, "and" should be -- of --. Col. 15, Line 22, "Dupinol" should be -- Duponol --.

SIGNED AND
SEALED

JUL 7 1970

(SEAL)
Attest:

Edward M. Fletcher, Jr.
Attesting Officer

WILLIAM E. SCHUYLER, JR.
Commissioner of Patents